United States
Osborne

4,069,080

Jan. 17, 1978

[54] METHOD AND APPARATUS OF BONDING SUPERPOSED SHEETS OF POLYMERIC MATERIAL IN A LINEAR WELD

[75] Inventor: Richard Francis Osborne, Mauldin, S.C.

[73] Assignee: W. R. Grace & Co., Duncan, S.C.

[21] Appl. No.: 695,277

[22] Filed: June 11, 1976

[51] Int. Cl.² ............... B29C 19/02; B23K 9/00; G02B 3/06
[52] U.S. Cl. ............ 156/272; 219/121 LM; 350/190
[58] Field of Search ............ 156/272; 219/121 L, 219/121 LM; 350/190

[56] References Cited
U.S. PATENT DOCUMENTS

| | | | |
|---|---|---|---|
| 2,705,523 | 4/1955 | Hasselquist | 156/285 |
| 3,534,462 | 10/1970 | Cruickshank et al. | 350/190 X |
| 3,560,291 | 2/1971 | Foglia et al. | 156/272 |
| 3,835,912 | 9/1974 | Kristensen | 219/121 LM |

*Primary Examiner*—Douglas J. Drummond
*Attorney, Agent, or Firm*—John J. Toney; William D. Lee, Jr.; John B. Hardaway

[57] ABSTRACT

A cylindrical lens system is used to focus a laser beam into a line upon thermoplastic sheets in their area of contact thereby linearly welding the sheets together. By this method flattened thermoplastic tubing may be converted into bags with either straight or curved linear seals.

5 Claims, 3 Drawing Figures

METHOD AND APPARATUS OF BONDING SUPERPOSED SHEETS OF POLYMERIC MATERIAL IN A LINEAR WELD

FIELD OF THE INVENTION

This invention relates to bonding together of superposed or contacting sheets of polymeric material. Particularly, this invention relates to the sealing together of thermoplastic sheet materials in a linear weld using radiant energy means such as the beam from a laser source.

BACKGROUND OF THE INVENTION

Many materials such as thermoplastic film, woven fabric from polymeric yarn, and flattened plastic tubing are manufactured in a sheet-like form and in order to form a useful end product from the material it is necessary to seal the sheet-like material to itself or to a similar material. If the material is thermoweldable or heat fusible it may be sealed to itself or to a similar material by the application of energy which raises the temperature of the material to its welding or fusing temperature. Thermoplastic sheets made from materials such as polyethylene, polypropylene, polyvinyl chloride, vinylidene chloride copolymers, etc. are readily heat sealable or heat weldable; and, in the prior art, sealing or welding has been accomplished by mechanically pressing two sheets of thermoplastic film together between heated seal bars and applying radio frequency energy, and by applying heated and compressed air blown through opposed nozzles to seal the material together. In addition to radio frequency energy, other sources of radiant energy have been employed to seal together thermoplastic materials. One such energy source is the laser described in U.S. Pat. No. 3,560,291 which issued on Feb. 2, 1971 to A. J. Foglia et al. The Foglia et al patent shows the bonding of thermoplastic resin film using radiation from a laser source. In another prior art disclosure, the laser welding of plastic tubes is described in U.S. Pat. No. 3,769,117 which issued on Oct. 30, 1973 to William Edmund Bowen et al. An additional application of laser energy to the processing of thermoplastic materials is a method of forming a tear line in a multilayer laminate as described in U.S. Pat. No. 3,790,744 which issued to William Edmund Bowen on Feb. 5, 1974. However, in all of these prior art methods which employ laser energy to seal thermoplastic materials, the energy is applied with the beam focused to a point. This requires that in order to seal in a line the beam must be scanned or moved across the area to be sealed or the material must be moved in a longitudinal or in a transverse direction so that the focal point of the beam traces a line. The movement of material longitudinally through the point of a beam is illustrated quite clearly in the aforementined patent to Bowen, U.S. Pat. No. 3,790,744, where in FIG. 1 thereof themoplastic film is continuously moved through the focal point of a beam in order to form a line of weakness in the film. However, it takes a relatively long period of time to move a point or spot across material having commercially usable widths and such long periods are greater than can be practically tolerated in a manufacturing process.

Accordingly, an object of the present invention is to provide a method and apparatus of welding together heat sealable materials with laser energy wherein the laser beam does not have to be moved or scanned across the material to be sealed or the material does not have to be moved through a stationary beam.

Another object of the present invention is to increase the speed of sealing thermoplastic materials with a laser beam.

The accomplishment of the foregoing and other objects will be apparent to those skilled in the art from the following Summary of The Invention, Drawings, and Detailed Description of the Preferred Embodiment.

SUMMARY OF THE INVENTION

In one aspect, the subject invention is the use of a lens system to focus the beam from a laser source in the shape of a line upon a heat sealable material. Preferably, a cylindrical lens is used to focus the laser beam into a line.

In another aspect, the invention is a method of welding superposed sheets of polymeric material together with a laser energy source comprising the steps of pneumatically clamping the sheets together in the area to be welded and focusing the beam from the laser energy source into a line upon at least one side of the clamped area thereby bonding the sheets together in a linear weld. The invention also encompasses the splitting of the laser beam into first and second components and directing the beam components to opposed sides of the clamped together sheets so that coinciding lines may be focused on the opposed sides of the sheets.

In still another aspect, the present invention is an apparatus for bonding contacting or superposed sheets of polymeric material together in a linear weld comprising a laser and cylindrical lens for focusing the beam from the laser into a line on a surface of the superposed or contacting sheets. The cylindrical lens may be part of a lens system which includes lenses which expand the beam and thereafter converge the beam upon the cylindrical lens whereupon the cylindrical lens expands the beam into a line. The apparatus of the present invention also may include pneumatic clamping means to hold the sheets together, means for dividing the beam from the laser into first and second components, and means to direct the two components to opposed sides of the sheets.

IN THE DRAWINGS

In the drawings which are appended hereto and made a part of this disclosure,

PREFERRED EMBODIMENT

Figure 1:
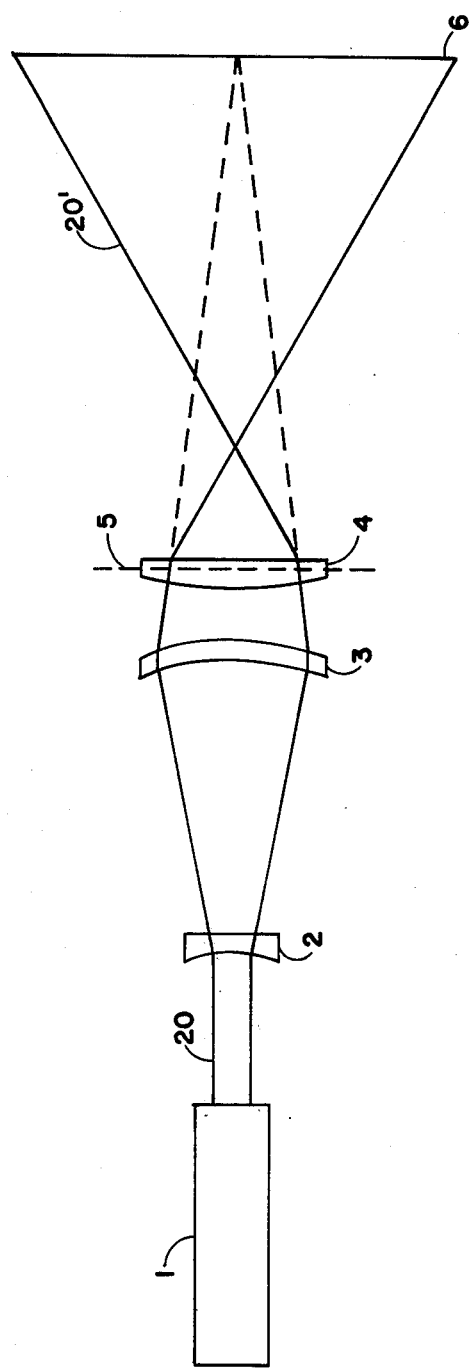
FIG. 1 is a schematic representation of the apparatus of the subject invention wherein a laser beam is expanded into a line.

Referring now to FIG. 1, the preferred apparatus and method of the present invention will be described. Laser beam 20 is generated by $CO_2$ laser energy source 1 and impinges upon beam expander lens 2. The $CO_2$ gas laser is preferred for use in thermowelding plastic materials as the energy in the beam generated by the laser has wave lengths which are readily absorbed in thermoplastic materials such as copolymers of vinyl chloride and vinylidene chloride commonly known as "Saran,"

in the ethylene vinyl acetate copolymer, and in polyethylene.

In FIG. 1, as laser beam 20 is emitted from laser source 1, it passes through beam expander lens 2 which is a lens of the plano-concave type. A preferred focal length for lens 2 would be −45 mm.

After leaving lens 2, the beam 20 impinges upon converging lens 3 which is of the meniscus type that collects the beam and prevents further diversion at this point. In the preferred embodiment of FIG. 1 the converging lens 3 has a focal length of approximately 127 mm. Upon leaving the converging lens, the beam 20 is directed upon cylindrical lens 4 which preferably has a focal length of about 38 mm. After passing through the cylindrical lens, the beam 20 assumes its expanded or designated beam 20' whereupon it can be focused upon a surface as line 6. Thus, the cylindrical lens system comprising beam expander 2, converging lens 3, and cylindrical lens 4 has converted the essentially collimated beam 20 having a circular cross section into beam 20' which when focused upon a surface is in the form of line 6. The proper spacing of the lenses is dependent upon the focal lengths of the lenses and the spacing can be readily determined by one skilled in the use of optical lens systems. A prime consideration is, however, that the lenses be as close together as practical for maximum optical efficiency. Also, the length of the line 6 can be varied by changing the focal length of cylindrical lens 4.

The axis of the cylindrical lens 4 is designated by the dashed line 5 and by tilting or rotating the lens 4 about this axis to a fixed position, the line 6 can be made to curve and will be in the shape of a circular segment. When the lens 4 is vertical or perpendicular to the plane of the drawing in FIG. 1, the line 6 will be straight.

The linear beam 20' may be focused upon superposed or contacting layers of polymeric material and with a pulse from the laser source of the order of 0.125 seconds sealing can be accomplished. To accomplish the same result by either moving the film through a spot beam or by scanning the spot or point across the width of the sheets would take considerably longer period of time, the increased length of time being approximated by the formula, $t = $ [width of sheet/width of spot] $\times 0.125$ sec.

In order to more effectively and quickly seal two adjacent or superposed thermoplastic sheets together, it is preferred that the laser energy be applied from both sides of the sheets while they are in contact. As used herein, the word "superposed" means not only sheets which are laid one on top of the other in a horizontal position but also means sheets which are adjacent or juxtaposed vertically. Thus, in FIG. 2, superposed sheets 13 may be either horizontally or vertically arranged.

Figure 2:
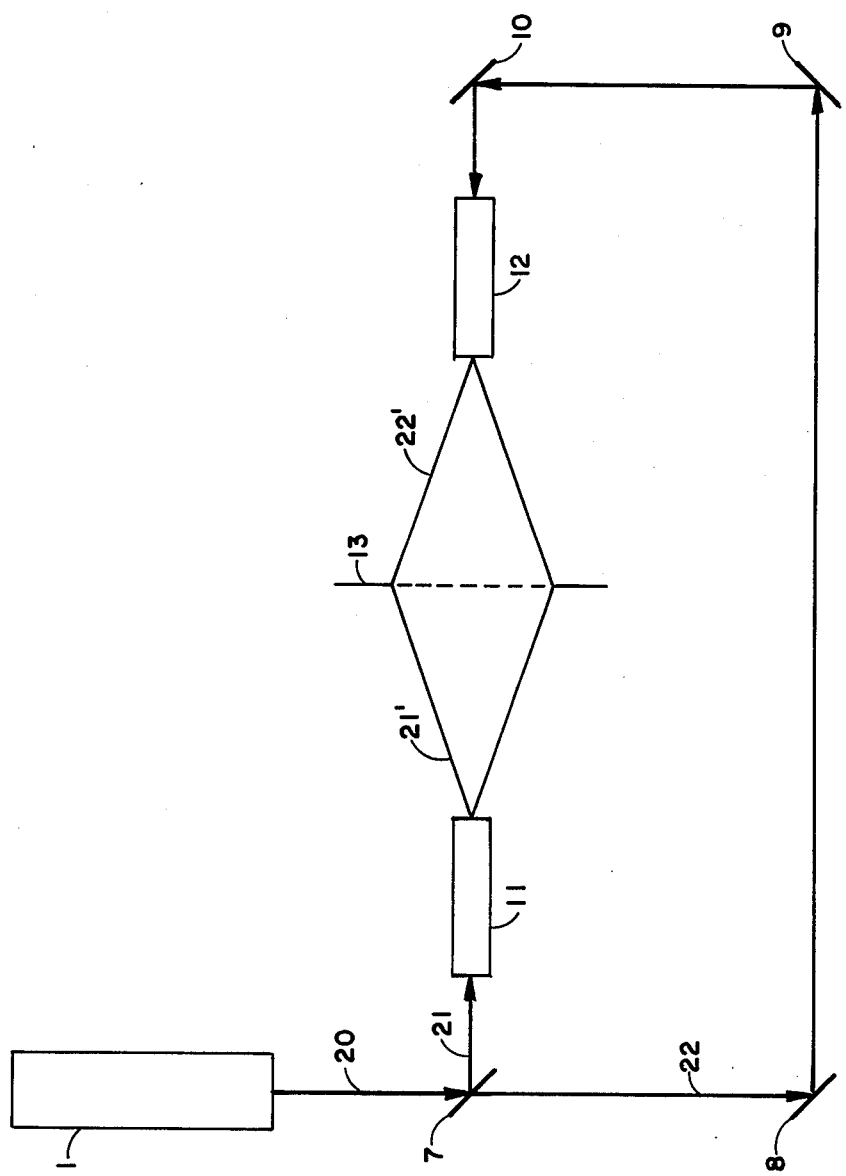
FIG. 2 is a schematic representation of the means for dividing the laser beam into two components and the means for directing the beam to opposed sides of superposed polymeric sheets; and, FIG. 3 shows the pneumatic means for clamping together superposed thermoplastic sheets which are to be welded together by a laser beam.

Looking now at FIG. 2, laser source 1 is shown with beam 20 emitted therefrom which impinges on beam splitter 7 to divide beam 20 into two components 21 and 22. The beam splitter 7 is preferably a partially coated mirror that transmits either more or less than one-half of beam 20 according to the amount of coating and reflects the other portion. In the diagram as shown in FIG. 2 the beam splitter mirror 7 is tilted at a 45° angle so that the component 21 will be reflected at a right angle and the component 22 will travel in the original direction of beam 20 and be reflected from totally reflecting mirror surfaces 8, 9, and 10 so that the final orientation of beam component 22 is such that it is aligned to make it coaxial with beam 21. At this point, beam component 21 and beam component 22 pass through respective lens systems 11 and 12 which are systems similar to those shown in FIG. 1 wherein a collimated or circular cross section beam is converted into a line. Thus, beam components 21 and 22 are converted to line segments 21' and 22' and are focused upon the opposed sides of the superposed sheets 13. By applying energy from both sides of the superposed sheets, the likelihood of burning or overheating one of the sheets is greatly diminished and a more uniform heating and welding is accomplished.

Figure 3:
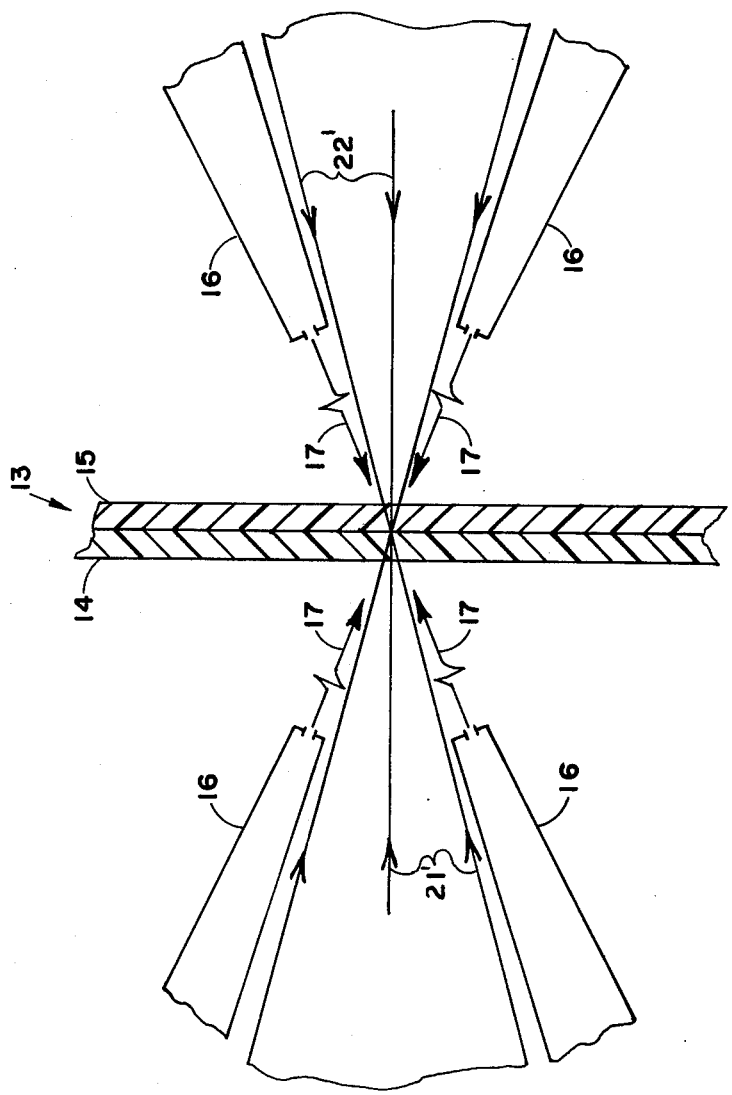

In order to make the weld between the superposed layers as strong and uniform as possible, it is preferred that the respective areas of the sheets which are to be welded together are in as intimate contact as possible. In a high speed process mechanical clamping is not only slow but a mechanical clamp at the exact area where the weld is desired would interfere with the laser beam. One means for accomplishing the desired clamping effect is the pneumatic clamping means shown in FIG. 3. In FIG. 3, air jets 16 which preferably have slot-shaped orifices are arranged so that streams of air 17 which are emitted therefrom impinge upon the same area of the superposed sheets 13 designated in FIG. 2.

The jets of air hold the sheets in intimate contact while a pulse from the laser source causes beam components 21' and 22' to impinge upon the area thus welding the area together in a linear weld. The proximity of the jets to the superposed sheets and the flow of air necessary to cause the sheets to contact intimately can be adjusted depending on the thickness of the sheets and their flexibility. These adjustments are well within the skill of the art. Also, the jets 16 in this instance have orifices or openings which are slot-like and correspond to the length of the linear beam segment but if the beam segment is to be curvilinear the slots in the jet 16 can also be formed to be of corresponding shape. Flow volumes, pressures, and slot shapes can readily be selected by those skilled in the art.

Having thus described my invention, I claim:

1. A method of welding sheets of polymeric material together with a laser energy source comprising the steps of:
    a. pneumatically clamping at least two of said sheets together in the area to be welded with air impinging on opposed sides of said sheets; and,
    b. focusing the beam from said laser energy source into a line upon one side of the clamped area thereby bonding said sheets together in a linear weld.

2. The method of claim 1 including the step of focusing a beam of laser energy into a line on the opposed side of said clamped sheets, said lines coinciding from the opposed sides of said clamped sheets.

3. The method of claim 1 wherein said sheets comprise flattened tubing.

4. A method of welding together sheets of polymeric material with a laser energy source whose energy will be preferentially absorbed in the material of said sheets comprising the steps of:
    a. splitting the beam from said source into first and second components;
    b. pneumatically clamping said sheets together with air impinging on opposed sides of said sheets;
    c. focusing said first beam component into a line upon one side of said clamped sheets;
    d. directing said second beam component to the opposite side of said sheets; and,
    e. focusing said second beam component into a line upon the opposite side of said clamped sheets whereby said linear beam components coincide and weld together said sheets.

5. The method of claim 4 including the step of splitting said beam into equal components.

* * * * *